United States Patent [19]

Lahoda

[11] 4,428,917
[45] Jan. 31, 1984

[54] PURIFICATION OF SILICON

[75] Inventor: Edward J. Lahoda, Pittsburgh, Pa.

[73] Assignee: Westinghouse Electric Corp., Pittsburgh, Pa.

[21] Appl. No.: 381,092

[22] Filed: May 24, 1982

[51] Int. Cl.³ ............................................. C01B 33/02
[52] U.S. Cl. .................................... 423/350; 556/471
[58] Field of Search ............... 423/348, 349, 350, 325; 556/471, 483; 106/287.16

[56] References Cited

U.S. PATENT DOCUMENTS 2,953,466  9/1960  Brown ........................... 106/287.16

OTHER PUBLICATIONS

Emblem, H. G. article in "Chemical Products", (GB), vol. 20, pp. 493–494, Dec. 1957.
Gerrard, W. et al., article in "J. Chem. Soc.", (GB), 1956; pp. 1536–1539.

Primary Examiner—O. R. Vertiz
Assistant Examiner—Steven Capella
Attorney, Agent, or Firm—R. A. Stoltz

[57] ABSTRACT

A process for manufacturing (very high purity) solare voltaic cell grade silicon involving the steps of reacting impure silicon tetrachloride with a lower molecular weight alcohol (e.g. ethanol) to form a silicon alkoxide (e.g. tetraethyl silicate) and then isolating a pure silicon alkoxide by filtration and fractional distillation. The purified silicon alkoxide can then be chemically reduced by reacting with a metal (e.g. Na) thus recovering high purity elemental silicon. The reaction by-products (e.g. HCl and NaOR) can be used to regenerate the alcohol and resulting salt (e.g. NaCl) can be subjected to electrolysis to recover the metal and the halogen, thus leading to an overall process with total recycle of byproducts.

10 Claims, 1 Drawing Figure

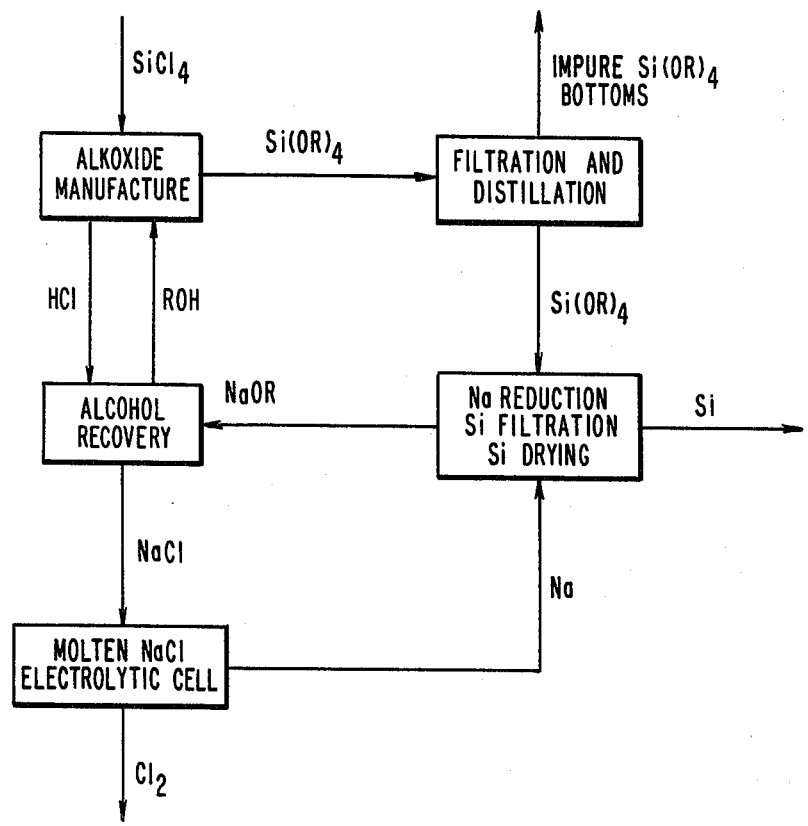

PURIFICATION OF SILICON

BACKGROUND OF THE INVENTION

1. Field of the Invention

This invention relates to the production of purified silicon suitable for use in solar cells. More specifically, the invention relates to the formation and separation of a silicon alkoxide and subsequent recovery of purified elemental silicon.

2. Description of the Prior Art

The production of solar grade (very high purity) silicon at a low cost is one of the prerequisites of an economically viable solar photovoltaic cell. At the present, a powdered metallurgical grade silicon of a purity of about 98.5% is available in large quantities on a commercial basis at what is considered a reasonable commodity price per pound. However, the level of concentration of impurities present in the silicon has to be reduced by a factor of 4 or 5 in order to even approach the desired purity for the solar voltaic cell applications. Unfortunately, the cost of the purification techniques is presently considered economically prohibitive.

Thus, over the last few years, there has been a growing interest in alternative methods for the preparation of low cost, high purity silicon. For example, chemical processes have been suggested such as the conversion of impure silicon tetrachloride to purify silicon by way of hydride formation and reduction/purification of silicon oxide by the reaction with carbon. Various ultra high temperature plasma reaction schemes have also been proposed such as the plasma zone refining of bars of silicon, purification of powdered silicon by successive acid leaching and plasma treatment and reduction/purification of silicon tetrachloride with sodium in a plasma reactor. However, all of these processes have experienced limited success either in terms of process expense and/or product purity.

SUMMARY OF THE INVENTION

In view of the need for an inexpensive method for producing solar grade silicon from commerically available metallurgical grade silicon, I have discovered an improved process for purification of silicon. The improvement according to the present invention comprises the steps of:

(a) formation of silicon tetrahalide;
(b) reacting said silicon tetrahalide with a lower alcohol thus forming a silicon alkoxide;
(c) separating the silicon alkoxide in a purified form; and
(d) chemically reducing the silicon alkoxide to recover purified silicon.

In the preferred embodiment, the separation step comprises filtering the impure silicon alkoxide and then fractionally distilling the raffinate to recover purified silicon alkoxide. Preferably, the halide is either chloride or bromide, the lower alcohol is methanol or ethanol, and the resulting silicon alkoxide is tetramethyl silicate or tetraethyl silicate. Further, according to the present invention, the chemical reduction step is performed by the reaction of a reducing metal with the silicon alkoxide, thus forming elemental silicon and the corresponding reducing metal alkoxide. This metal alkoxide is then reacted with a halogen containing acid, thus recovering the alcohol and the corresponding reducing metal halide salt. The reducing metal halide salt is then converted by electrolysis to the reducing metal and free halogen for recycle.

It is a primary object of the present invention to provide an inexpensive method of chemically isolating and recovering highly purified silicon suitable for solar cell applications. It is a further object to provide a purification method that is compatible with the use of contemporary commercially available silicon powder as the source of silicon. It is an associated object that the process be energy efficient and that total recycle of by-products be provided. Fulfillment of these objects and the presence and fulfillment of other objects will be apparent upon a complete reading of the specification and claims in view of the attached drawing.

BRIEF DESCRIPTION OF THE DRAWING

The FIGURE illustrates schematically the process of purifying silicon according to the present invention.

DESCRIPTION OF THE PREFERRED EMBODIMENT

According to the present invention and as illustrated in the drawing, the silicon to be purified is initially converted or isolated as a tetrahalide salt. Preferably, the chloride or bromide salts are employed while silicon tetrachloride, as illustrated in the drawing, is the most preferred starting material. Since many existing commercial scale processes for the recovery of metals such as silicon, zirconium, hafnium, and the like, involve an initial crude chlorination of ore-bearing sand that results in the isolation of a liquid silicon tetrachloride phase as a byproduct, the choice of silicon tetrachloride is economically attractive and very practical. Thus, the source of silicon as a feedstock for the purification process of the present invention can conveniently be a stream of silicon tetrachloride from an existing commercial unit. However, the chemical conversion of essentially any silicon or silicon compound to the corresponding halide salt by any of the methods well known in the art independent of the particular silicon source is to be considered an equivalent feedstock source for purposes of this invention. For convenience, the following description and illustration of the present invention will be predominantly directed to the silicon tetrachloride form with the understanding that other halides and particularly bromide are viewed as being equivalent.

As schematically illustrated in the drawing, silicon tetrachloride is initially converted to silicon alkoxide by the reaction with a lower alcohol according to the following equation:

$$SiCl_4 + 4ROH \rightarrow Si(OR)_4 + 4HCl$$

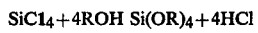

The lower alcohols of particular interest are the low molecular weight relatively volatile alcohols (unsubstituted, saturated aliphatic alcohols) having up to about 10 carbon atoms. The lower molecular weight alcohols such as methanol and ethanol are particularly preferred in that they lead to reasonably volatile alkoxides which can be fractionally distilled, the preferred subsequent separation/purification step. The halogen-containing acid (e.g. HCl) produced during the alkoxide formation reaction can be advantageously separated and recycled to recover the alcohol as explained later. The actual alkoxide formation reaction employed can generally be any of the methods known in the art including, but not limited to, catalytic alkoxidation in various organic solvents, initial formation of a higher molecular alkoxide followed by alcohol substitution and the like.

The silicon tetra-alkoxide phase formed in the previous step is then isolated and separated from the impurities originally present in the silicon. Preferably this separation/purification step involves filtration followed by fractional distillation. However, other separation techniques well known in the art, such as centrifugation, solvent extraction, various chromatagraphic techniques, and the like, can be alternatively employed or can supplement the filtration and distillation. When a lower molecular weight alcohol is employed, the fractional distillation step is favored. For example, if ethanol is used, the tetraethyl silicate (the alkoxide) will exhibit a boiling point of about 165° C. It is envisioned that the fractional distillation can be advantageously performed at reduced pressures to insure thermal stability and to insure an adequate rate of distillation. As illustrated, the impure alkoxide distillation bottoms can be recovered as can the lighter more volatile distilled products and then both further processed to recover any valuable contaminants.

The desired purified silicon tetra alkoxide phase is then treated in a chemical reduction stage by the addition of a more reactive reducing metal such as an alkali metal or an alkaline earth metal, such as Li, Na, K, Ca or Mg. Preferably, sodium is employed according to the following equation:

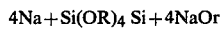
$$4Na + Si(OR)_4 \rightarrow Si + 4NaOr$$

Purified elemental silicon can then be isolated by filtration, centrifugation, or the like, and subsequently dried to essentially complete the purification and recovery of solar photovoltaic cell grade silicon.

The reducing metal alkoxide (e.g. NaOR) is then preferably sent to an alcohol recovery stage. As illustrated, the halogenated acid produced as a byproduct in the silicon alkoxide production step can conveniently be employed to convert the reducing metal alkoxide back to the original alcohol for recycle, according to the following equation:

$$NaOR + HCl \rightarrow HOR + NaCl$$

This reaction also produces a reducing metal salt (e.g. NaCl). This reducing metal salt can then be separated from the alcohol and optionally subjected to a molten salt electrolysis step that recovers the reducing metal and a gaseous elemental halogen. The reducing metal can be recycled to the previous silicon tetra-alkoxide reduction step while the halogen (e.g. Cl$_2$) can be returned to the crude chlorination step or its counterpart. In this manner, the overall process can essentially be byproduct free and virtually self-sustaining.

The selection of equipment and specific reaction conditions to be employed in the present process can be readily determined according to established principles for handling the respective materials. The specific equipment and techniques being employed are viewed as standard industrial procedures and methods. Because of recycle, the cost of the reagents can be held to a minimum. Energy requirements are similarly viewed as being minimal.

Having thus described the preferred embodiment with a certain degree of particularity, it is manifest that many changes can be made within the details of operation operating parameters, and implementation of the steps without departing from the spirit and scope of this invention. Therefore, it is to be understood that the invention is not limited to the embodiments set forth herein for purposes of exemplification, but is to be limited only by the scope of the attached claims, including the full range of equivalents to which each step thereof it entitled.

I claim:

1. In a process for purification of silicon, the specific improvement comprising the steps of:
   (a) formation of silicon tetrahalide;
   (b) reacting said silicon tetrahalide with a lower alcohol thus forming a silicon alkoxide;
   (c) separating the silicon alkoxide in a purified form; and
   (d) chemically reducing the silicon alkoxide to recover a purified silicon.

2. A process of claim 1 wherein the separation step comprises filtering the impure silicon alkoxide and then fractionally distilling the raffinate to recover purified silicon alkoxide.

3. A process of claim 1 or 2 wherein said halide is chloride, said lower alcohol is methanol, and said alkoxide is tetramethyl silicate.

4. A process of claim 1 or 2 wherein said halide is chloride, said lower alcohol is ethanol, and said alkoxide is tetraethyl silicate.

5. A process for the manufacture of high purity silicon comprising the steps of:
   (a) producing an impure silicon halide;
   (b) reacting said silicon halide with a lower alcohol to produce a corresponding silicon alkoxide;
   (c) filtering and fractionally distilling said silicon alkoxide to isolate a purified silicon alkoxide; and
   (d) chemically reducing said silicon alkoxide thus recovering purified silicon.

6. A process of claim 5 wherein said halide is bromide or chloride, said lower alcohol is methanol or ethanol, and said alkoxide is tetramethyl or tetraethyl silicate.

7. A process of claim 6 wherein said halide is chloride, said lower alcohol ethanol, and said alkoxide is tetraethyl silicate.

8. A process of claim 1 or 5 wherein said chemical reduction step is performed by the reaction of a reducing metal with said silicon alkoxide thus forming elemental silica and the corresponding reducing metal alkoxide.

9. A process of claim 8 wherein said reducing metal alkoxide is recovered by reacting with a halogen containing acid thus recovering the alcohol and the corresponding reducing metal halide salt.

10. A process of claim 9 wherein said reducing metal halide salt is electrolytically converted to said reducing metal and free halogen for recycle.

* * * * *